(12) United States Patent
Yu et al.

(10) Patent No.: US 10,089,522 B2
(45) Date of Patent: Oct. 2, 2018

(54) HEAD-MOUNTED DISPLAY WITH FACIAL EXPRESSION DETECTING CAPABILITY

(71) Applicant: BinaryVR, Inc., Burlingame, CA (US)

(72) Inventors: Jihun Yu, Santa Clara, CA (US); Jungwoon Park, San Mateo, CA (US)

(73) Assignee: BINARYVR, INC., Burlingame, CA (US)

( * ) Notice: Subject to any disclaimer, the term of this patent is extended or adjusted under 35 U.S.C. 154(b) by 4 days.

(21) Appl. No.: 15/276,674

(22) Filed: Sep. 26, 2016

(65) Prior Publication Data

US 2017/0091535 A1    Mar. 30, 2017

Related U.S. Application Data

(60) Provisional application No. 62/234,478, filed on Sep. 29, 2015, provisional application No. 62/337,261, filed on May 16, 2016.

(51) Int. Cl.
  *G06K 9/00* (2006.01)
  *G06T 13/40* (2011.01)
  *G06T 17/20* (2006.01)
  *H04N 5/247* (2006.01)

(52) U.S. Cl.
  CPC ..... *G06K 9/00315* (2013.01); *G06K 9/00248* (2013.01); *G06K 9/00255* (2013.01); *G06K 9/00281* (2013.01); *G06T 13/40* (2013.01); *G06T 17/20* (2013.01); *H04N 5/247* (2013.01)

(58) Field of Classification Search
  CPC ........... G06K 9/00315; G06K 9/00248; G06K 9/00281; G06K 9/00255; H04N 5/247; G06T 13/40; G06T 17/20
  See application file for complete search history.

(56) References Cited

U.S. PATENT DOCUMENTS

| | | | |
|---|---|---|---|
| 6,091,546 A * | 7/2000 | Spitzer | G02B 27/017 345/8 |
| 6,313,864 B1 | 11/2001 | Tabata et al. | |
| 2005/0083248 A1 * | 4/2005 | Biocca | A41D 31/0088 345/8 |

(Continued)

FOREIGN PATENT DOCUMENTS

JP    2011-036483 A    2/2011

OTHER PUBLICATIONS

Xiong, X. et al., "Supervised Descent Method and its Applications to Face Alignment," Computer Vision and Pattern Recognition, pp. 532-539 (2013)).

(Continued)

*Primary Examiner* — Ming Hon
(74) *Attorney, Agent, or Firm* — Fenwick & West LLP

(57) ABSTRACT

Embodiments relate to detecting a user's facial expressions in real-time using a head-mounted display unit that includes a 2D camera (e.g., infrared camera) that capture a user's eye region, and a depth camera or another 2D camera that captures the user's lower facial features including lips, chin and cheek. The images captured by the first and second camera are processed to extract parameters associated with facial expressions. The parameters can be sent or processed so that the user's digital representation including the facial expression can be obtained.

9 Claims, 15 Drawing Sheets

(56) References Cited

U.S. PATENT DOCUMENTS

| | | | | |
|---|---|---|---|---|
| 2005/0267826 | A1* | 12/2005 | Levy | B25J 9/1689 |
| | | | | 705/34 |
| 2007/0047768 | A1* | 3/2007 | Gordon | G06K 9/00255 |
| | | | | 382/103 |
| 2007/0127785 | A1* | 6/2007 | Hiraizumi | G06K 9/00281 |
| | | | | 382/118 |
| 2008/0201144 | A1* | 8/2008 | Song | G06K 9/00281 |
| | | | | 704/236 |
| 2010/0079466 | A1* | 4/2010 | Griffin | G06K 9/00335 |
| | | | | 345/473 |
| 2011/0134026 | A1* | 6/2011 | Kang | G06F 3/011 |
| | | | | 345/156 |
| 2012/0280893 | A1 | 11/2012 | Holakovszky | |
| 2013/0176415 | A1* | 7/2013 | Kim | H04N 5/23219 |
| | | | | 348/78 |
| 2014/0361976 | A1* | 12/2014 | Osman | G02B 27/0172 |
| | | | | 345/156 |
| 2014/0369558 | A1* | 12/2014 | Holz | G06K 9/00201 |
| | | | | 382/103 |
| 2015/0023603 | A1* | 1/2015 | Whitehill | G06K 9/00281 |
| | | | | 382/195 |
| 2015/0035825 | A1* | 2/2015 | Zhou | G06T 13/40 |
| | | | | 345/419 |
| 2015/0084950 | A1* | 3/2015 | Li | G06K 9/00214 |
| | | | | 345/419 |
| 2015/0212343 | A1* | 7/2015 | Fonte | G06Q 30/0621 |
| | | | | 351/159.74 |
| 2015/0269424 | A1 | 9/2015 | Bacivarov et al. | |
| 2015/0310263 | A1* | 10/2015 | Zhang | G06K 9/00315 |
| | | | | 382/103 |
| 2016/0328628 | A1* | 11/2016 | Bhat | G06K 9/6201 |

OTHER PUBLICATIONS

Cao, C. et al., "3D Shape Regression for Real-time Facial Animation," ACM Transactions on Graphics (SIGGRAPH 2013), 2013).

Blanz, V. et al., "A Morphable Model for the Synthesis of 3D Faces," Proceedings of the 26th Annual Conference on Computer Graphics and Interactive Techniques, (1999)).

Cootes, T.F. et al., "Active Appearance Models," Proc. European Conference on Computer Vision 1998, 1998, (H. Burkhardt et al., Eds.), pp. 484-498, vol. 2.

Li, H. et al., "Realtime Facial Animation with On-the-fly Correctives."

Saragih, J.M. et al., "Deformable Model Fitting by Regularized Landmark Mean-Shift," Int. J. Comput. Vis., 2011, pp. 200-215, vol. 91.

PCT International Search Report and Written Opinion, PCT Application No. PCT/US2016/053821, dated Jan. 2, 2017, 15 pages.

* cited by examiner

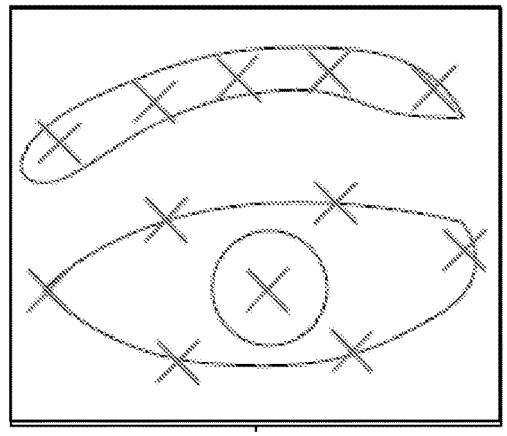 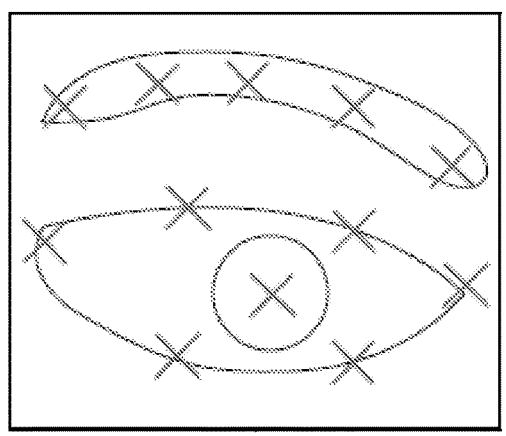
FIG. 5A  FIG. 5B
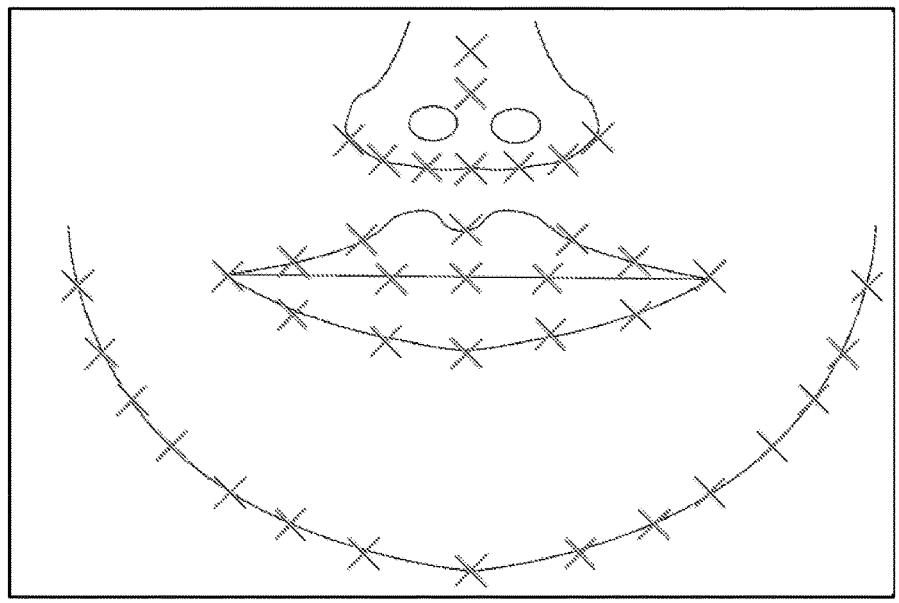
FIG. 5C

HEAD-MOUNTED DISPLAY WITH FACIAL EXPRESSION DETECTING CAPABILITY

CROSS-REFERENCE TO RELATED APPLICATIONS

This application claims priority under 35 U.S.C. § 119(e) to U.S. Provisional Patent Application Ser. No. 62/234,478 filed on Sep. 29, 2015; and U.S. Provisional Patent Application Ser. No. 62/337,261 filed on May 16, 2016, which are incorporated by reference herein in their entirety.

FOREIGN GOVERNMENT SUPPORT

This invention was made with support from Republic of Korea Government Agency for TIPS Small and Medium Business Administration (SBMA) under project title "Development of Real-Time Facial Expression Tracking Technology in Virtual Reality" with project registration number S2366044.

BACKGROUND

1. Field of Art

The disclosure generally relates to a head-mount display unit for detecting a user's facial expressions for use in virtual reality or augmented reality environment.

2. Description of the Related Art

Virtual reality (VR) and augmented reality (AR) are emerging sectors for applications such as gaming, education, medical and social networking services because they enable compelling immersive real life experiences. Some of these applications involve a social platform that enables users to engage with other users through 3D representation (e.g., avatars) of themselves displayed on display devices. By enabling the users to interact with other users through virtual or augmented version of the reality, the user experience for these applications can be enhanced.

In human interactions, facial expressions convey a large amount of information to others about the emotional states of an individual. To provide more enriched interaction between users, user's 3D representation may be developed to show facial expressions of the users. In this way, more information about a user's state of mind can be effectively communicated to other users in VR or AR environment.

SUMMARY

Embodiments relate to detecting facial expressions by using a head-mounted display. First images are captured by a first image capturing device on the head-mounted display. The first images include an upper portion of a user's face. Second images are captured by a second image capturing device on the head-mounted display. The second images include the user's lower portion of the face. The first and second images are processed to extract facial expression parameters representing a facial expression of the user.

In one embodiment, the first image capturing device includes a pair of infrared cameras. The second image capturing device includes one of a depth camera, a color camera, an infrared camera or two stereoscopic cameras In one embodiment, the first images and the second images are processed at least to detect landmark locations associated with the user's eye and the user's eyebrow from the first images, and detect landmark locations associated with a lower portion of the user's face from the second images.

In one embodiment, the extracted facial expression parameters are applied to a digital representation of the user to generate a graphical representation of the user.

In one embodiment, calibration is performed by capturing and processing calibration images representing a neutral face of the user.

In one embodiment, the calibration is performed by generating a personalized neutral face mesh based on the calibration images, and building a personalized tracking model by applying a deformation transfer technique to the personalized neutral face mesh.

In one embodiment, a blendshape model is fit to landmark locations in the first images and the second images based on the personalized tracking model to obtain the facial expression parameters.

In one embodiment, the first images and the second images are processed in real-time to obtain the facial expression.

Embodiments also relate to a head-mounted display unit that includes a first capturing device, a second capturing device, a display device and a body. The first capturing device captures an upper portion of a user's face including an eye region. The second capturing device is at a location below the first capturing device and captures a lower portion of the user's face. The display device displays images to the user. The body is mounted with the first and second capturing devices and the display device.

In one embodiment, the second capturing device is mounted on an extension member extending from the body toward the lower portion of the user's face.

In one embodiment, the head-mounted display unit further includes a slidable mount on which the second capturing device is mounted.

In one embodiment, the display device includes a first display and a second display. The first display displays left side images to a left eye of the user and the second display displays right side images to a right eye of the user.

In one embodiment, the first capturing device includes a pair of cameras where each of the cameras is installed at an opposite side of the body.

In one embodiment, the first capturing device includes a camera installed in a middle of the body.

In one embodiment, the second capturing device is mounted directly onto the body.

In one embodiment, the body has a bulging upper portion to enclose the eye region.

In one embodiment, the display device includes a pair of distinct display units and the first capturing device comprises two cameras between the pair of display units.

Embodiments also relate to a virtual reality system including a head mounted display unit and a computing device. The computing device is communicatively coupled to the head-mounted display unit. The computing device receives the first and second images from the head-mounted display unit, and processes the first images and the second images to extract facial expression parameters representing a facial expression of the user.

BRIEF DESCRIPTION OF DRAWINGS

Figure (FIG. 1 is a block diagram illustrating a system for capturing and processing user's facial expressions, according to one embodiment.

FIGS. 5A through 5C are diagrams illustrating facial landmarks tracked to determine facial expressions, according to one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. The following description that alternative embodiments of the structures and methods illustrated herein may be employed without departing from the principles described herein.

Embodiments relate to detecting a user's facial expressions in real-time using a head-mounted display unit that includes an image capturing device (e.g., infrared camera) for capturing an upper portion of a user's face including an eye region, and another image capturing device (e.g., depth camera) for capturing the user's lower facial features including at least one of a nose, lips, chin and cheek. The images captured by the first and second image capturing devices are processed to extract parameters associated with facial expressions. The parameters can be sent or processed so that the user's digital representation including the facial expression can be generated.

An eye region as described herein refers to a facial region covering an eye and an eye brow above the eye.

Example Architecture for Facial Expression Detection System

Figure 1:
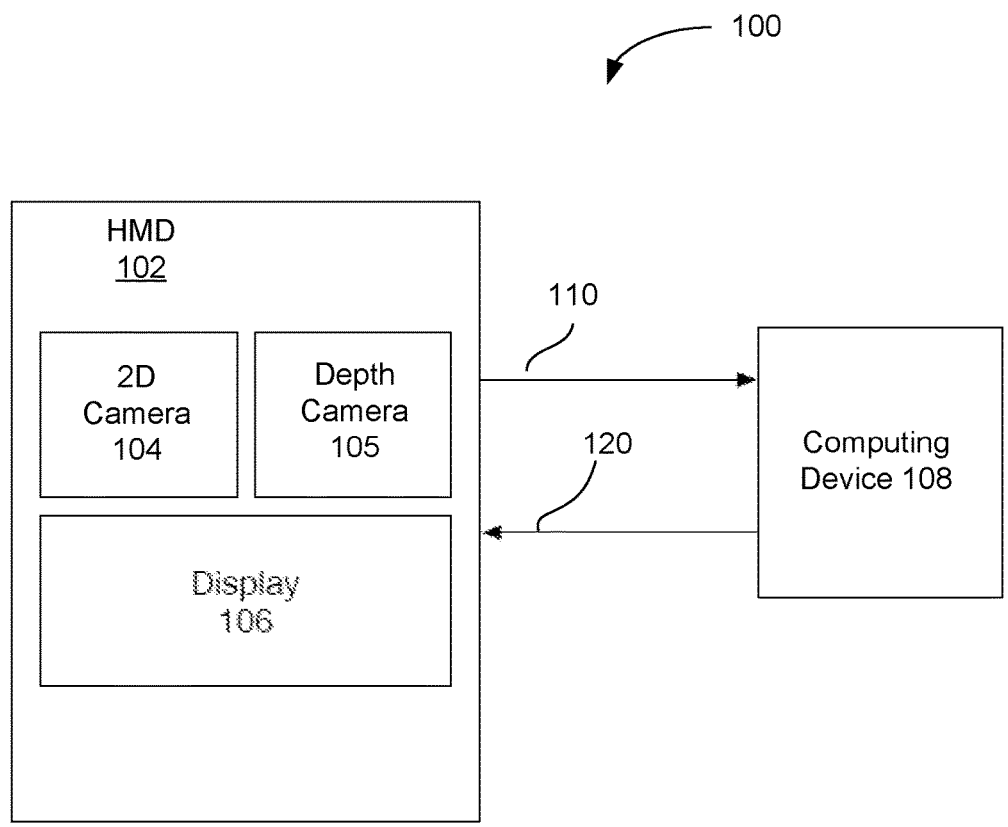

FIG. (FIG. 1 is a block diagram illustrating a system 100 for capturing and processing a user's facial expressions, according to one embodiment. The system 100 may include, among other components, a head-mounted display (HMD) 102 and a computing device 108 communicating with HMD 102. HMD 102 is used, in conjunction with the computing device 108, to detect the posture of the user, detect facial expression of the user, as well as display images to the user.

The computing device 108 may communicate with HMD 102 via wired or wireless communication. Images and sound data 120 for reproduction at HMD 102 can be sent from computing device 108. HMD 102 also sends information 110 indicating the posture of the users head and including captured images associated with facial expressions to computing device 108.

HMD 102 is worn on a user's head as illustrated below in detail with reference to FIG. 2C. HMD 102 may include, among other components, one or more 2D cameras 104, one or more depth cameras 105 and one or more displays 106. The details of displays 106 and its operating modules are omitted herein for the sake of brevity. Each 2D camera 104 captures an eye region of the user's face and may be embodied as an infrared camera or RGB camera (with or without lighting lamp). Each eye region includes an eye and an eye brow. On the other hand, the depth camera 105 generates depth images for the user's lower facial features that including at least one of nose, lip, cheek and chin.

The computing device 108 processes the images generated by the infrared camera 104 and the depth camera 105 to determine the user's facial expressions, as described below in detail with reference to FIG. 7. Instead of using a depth camera 105, 2D RGB camera or 2D infrared (IR) camera can also be used.

Although the computing device 108 is illustrated in FIG. 1 as being separate from HMD 102, the computing device 108 may be part of HMD 102.

Examples of Head-Mounted Display

Figure 2A:
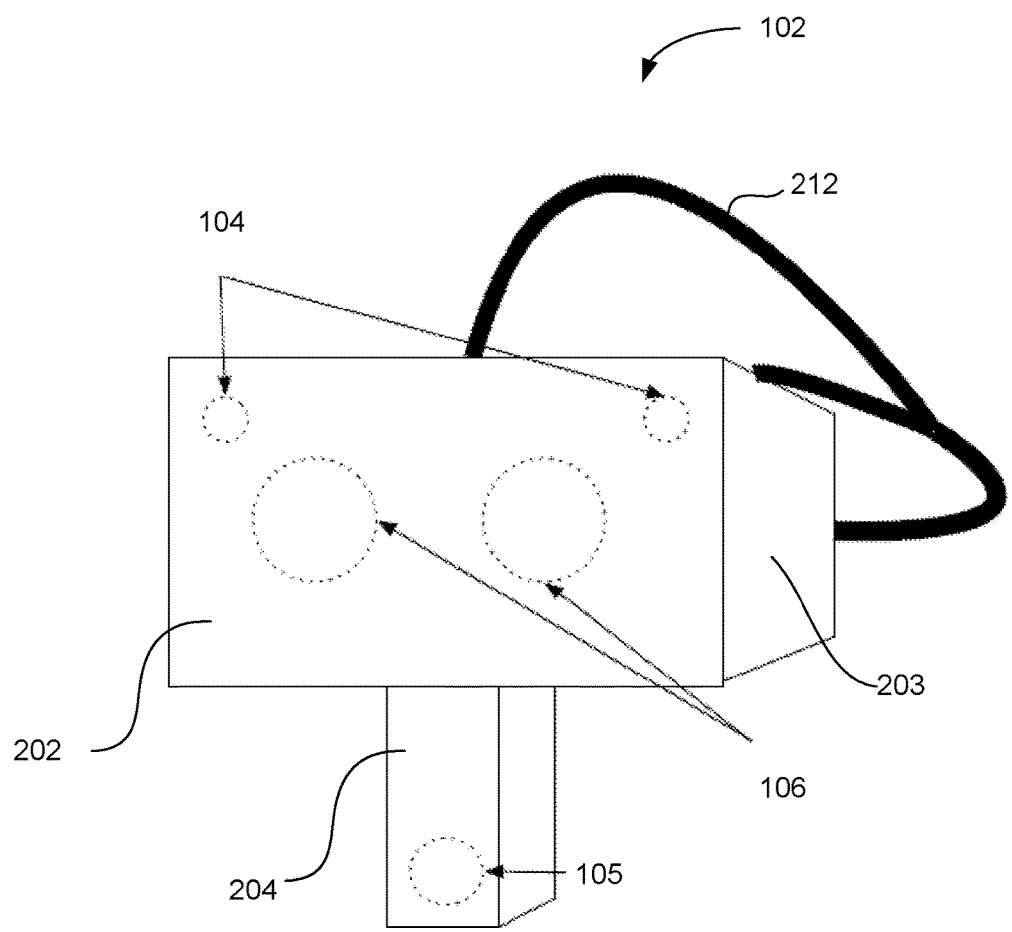
FIG. 2A is a schematic view of a head-mounted display unit of FIG. 1, according to one embodiment.

FIG. 2A is a schematic view of HMD 102, according to one embodiment. HMD 102 includes a main body 202 and a vertical extension member 204 extending downwards from the main body 202. The main body 202 is installed with 2D cameras 104, displays 106 and other sensors (e.g., gyroscope).

HMD 102 and the vertical extension member 204 may be coupled via a mechanism that enables the adjustment of the region of user's face captured by depth camera 105. Instead of vertical extension member, a member extending horizontally or in a slanted orientation may also be used to mount depth camera 105. Depth camera 105 provides (i) 3D depth map and (ii) 2D color images or infrared image of the captured region. The use of depth camera 105 to capture the user's lower facial features is advantageous, among other reasons, because 3D geometry information about lower facial features can be obtained with high accuracy. Instead of using depth camera 105, a 2D color camera can also be used to capture the user's lower facial features. Color images captured by 2D color camera may be processed at the computing device 108 to generated 3D geometry information about lower facial features.

HMD 102 may also be attached to straps 212 so that the user can secure HMD 102 to the user's head.

As illustrated in FIG. 2A, a pair of 2D cameras 104 are placed in the upper corners of a front wall of the main body 202 to capture respective regions (i.e., left and right eye regions) of a user's face. In alternative embodiments, the pair of 2D cameras can be placed at side walls 203 of the HMD 102. The 2D cameras 104 can also be placed immediately next to displays 106.

The displays 106 may include two distinct display modules: one for displaying left side images to the user's left eye and another for display right side images to the user's right eye. The two displays 106 may be physically separated. Alternatively, a single display module may be divided into two distinct display regions for separately displaying left and right side images.

Figure 2B:
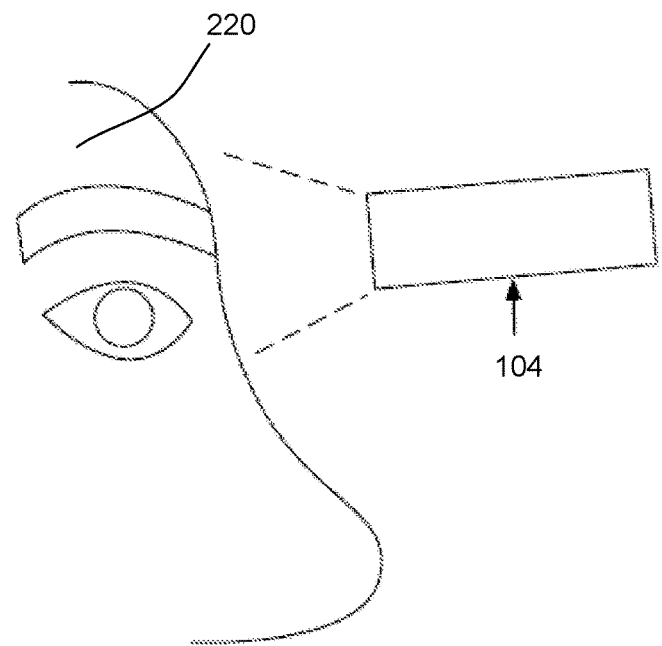
FIG. 2B is a schematic diagram illustrating a 2D camera for capturing images of a user's eye region, according to one embodiment.

FIG. 2B is a schematic diagram illustrating 2D camera 104 for capturing images representing an eye region of a user's face 220 including an eye and an eyebrow, according to one embodiment. 2D camera 104 is installed in the body 202 of the HMD 102 that faces the user's face when worn by the user. Specifically, 2D camera 104 captures one or both eye regions of the user's face.

Infrared camera may be used as 2D camera 104. The use of infrared camera to capture images of a region around the eye and the eyebrow is advantageous, among other reasons, because (i) an infrared camera can adequately capture facial features without coming into contact with the user's skin and (ii) operates under low light conditions that may occur due to blocking of external light when the HMD 102 is worn by the user.

In one embodiment, 2D camera 104 may be equipped with fisheye lens to capture a wide field of view. Because the distance from the 2D camera to the user's eye and eye brow is short (typically within 5 centimeters), the fisheye lens is used to capture the entire eye region. The depth camera 105 is also equipped with fisheye lens to capture a wide field of view.

Figure 2C:
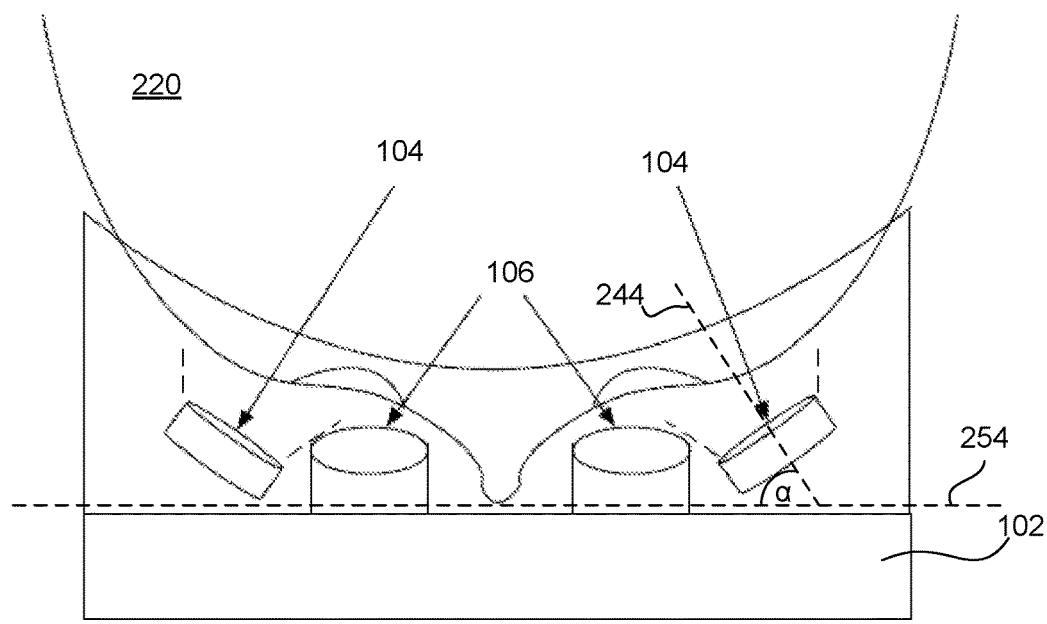
FIG. 2C is a schematic diagram illustrating components of a head-mounted display unit relative to a user's face, according to one embodiment.

FIG. 2C is a schematic diagram illustrating placement of components of HMD 102 relative to the user's face 220, according to one embodiment. HMD 102 of FIG. 2C has a pair of 2D cameras 104, one capturing a left eye region and the other capturing a right eye region. The center axis 244 of the 2D camera forms an angle α relative to a vertical plane 254. The angle α may be in the range of 30° to 45° to capture the eye region.

Figure 2D:
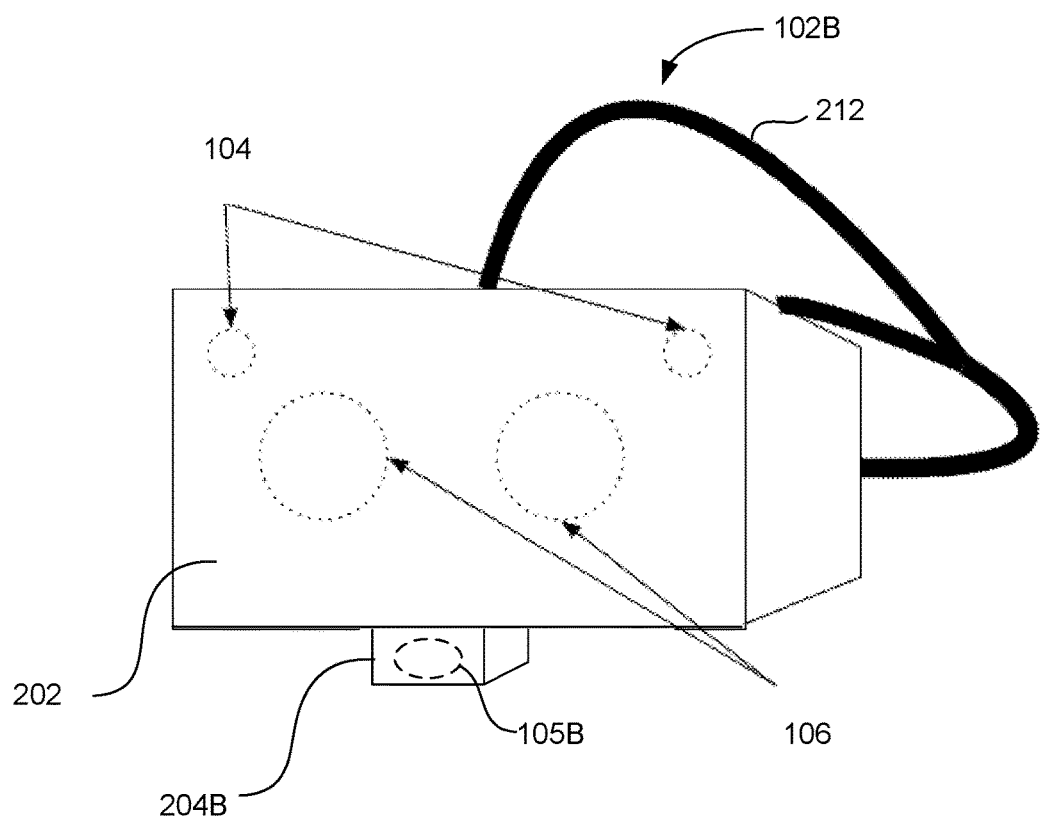
FIG. 2D is a schematic view illustrating a head-mounted display unit, according to another embodiment.

FIG. 2D is a schematic view of HMD 102B, according to another embodiment. HMD 102B is similar to HMD 102 of FIG. 2A but has mount 204B onto which camera 105B is attached to capture images of a lower portion of the user's face. Mount 204B is shorter than the vertical extension member of FIG. 2A. Camera 105B may be a depth camera or may be a RGB/grayscale camera. One or more infrared or visible light source (not shown) may also be attached to mount 204B to enable camera 105B to capture better images of the lower portion of the user's face. In an alternative embodiment, HMD 102 does not include a separate mount or a vertical extension member but has camera 105B mounted directly onto main body 202.

Figure 2E:
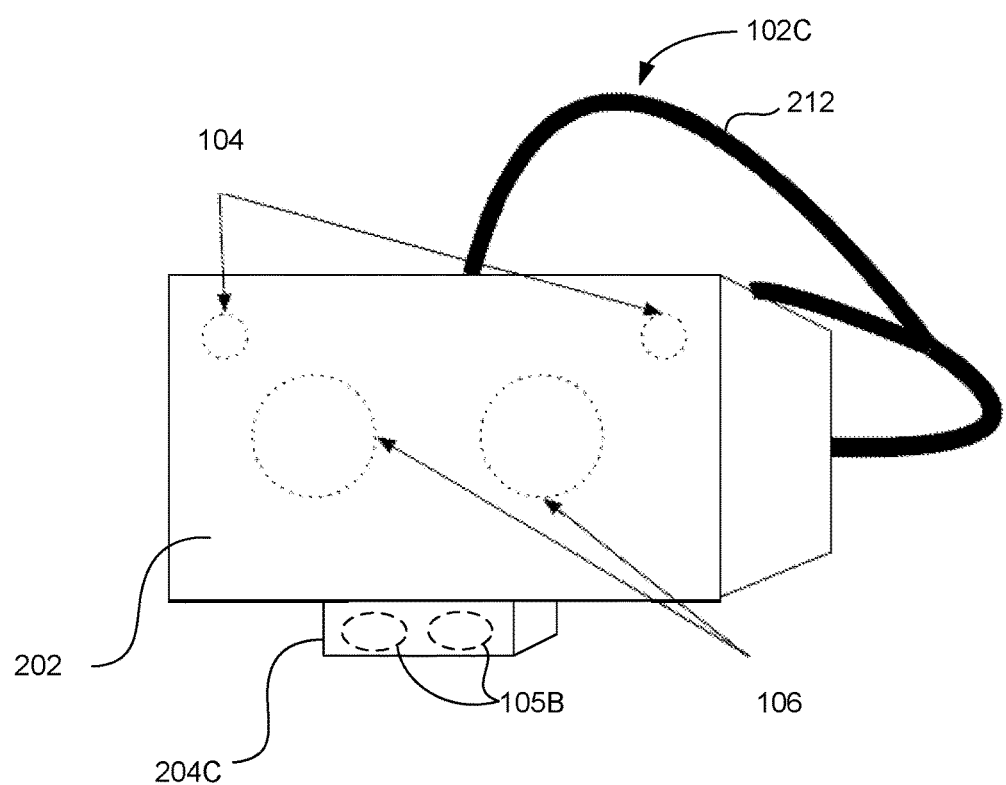
FIG. 2E is a schematic view illustrating a head-mounted display unit with a stereoscopic image sensors, according to another embodiment.

FIG. 2E is a schematic view of HMD 102C, according to another embodiment. HMD 102C is similar to HMD 102B of FIG. 2D, but has stereoscopic cameras 105B installed on a mount 204C. Both stereoscopic cameras 105B capture images of the lower portion of the user's face. The captured images are processed by the computing device 108 to determine the user's facial expression.

Figure 2F:
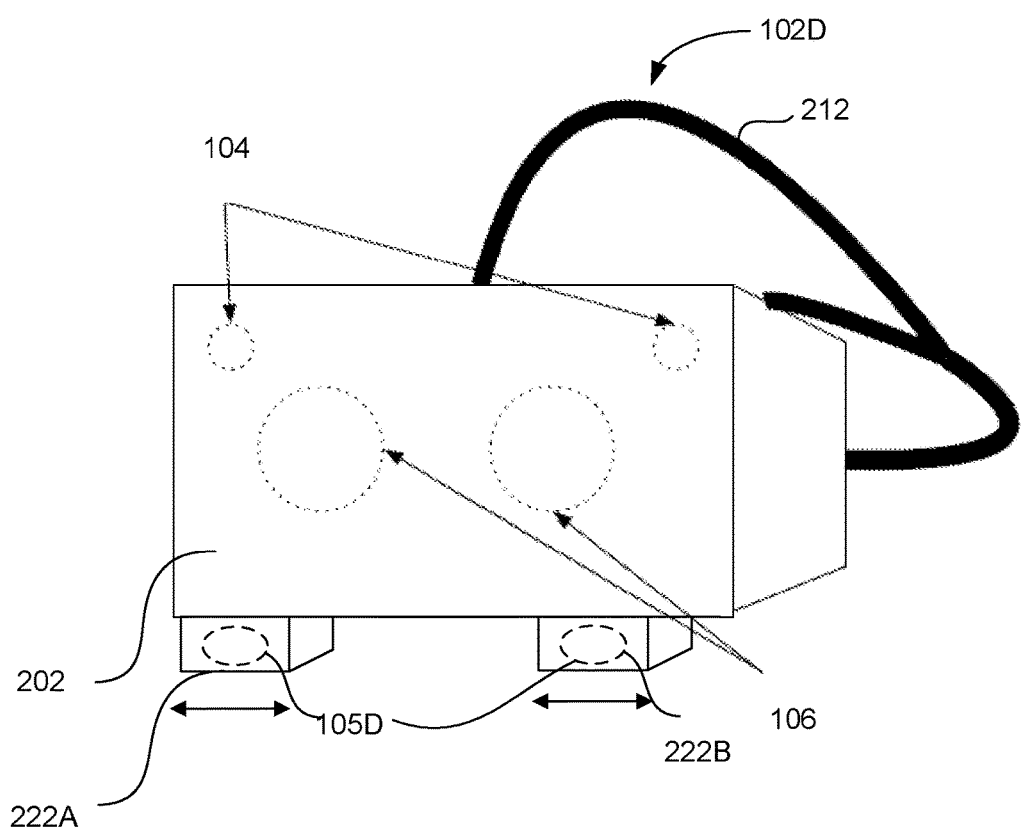
FIG. 2F is a schematic view illustrating a head-mounted display unit with a slidable stereoscopic images sensors, according to another embodiment.

FIG. 2F is a schematic view of HMD 102D, according to one embodiment. HMD 102D is similar to HMD 102C of FIG. 2E, but has mounts 222A, 222B that are slidable relative to main body 202. Mounts 222A, 222B are mounted with cameras 105D, which may be IR cameras or grayscale cameras. By enabling mounts 222A, 222B to slide relative to the main body 202, the locations of mounts 222A, 222B may be adjusted to better capture the lower portion of the user's face. In some embodiments, mounts 222A, 222B are moved manually by user. In other embodiments, mounts 222A, 222B are adjusted automatically by actuators (e.g., motors, not shown).

Figure 2G:
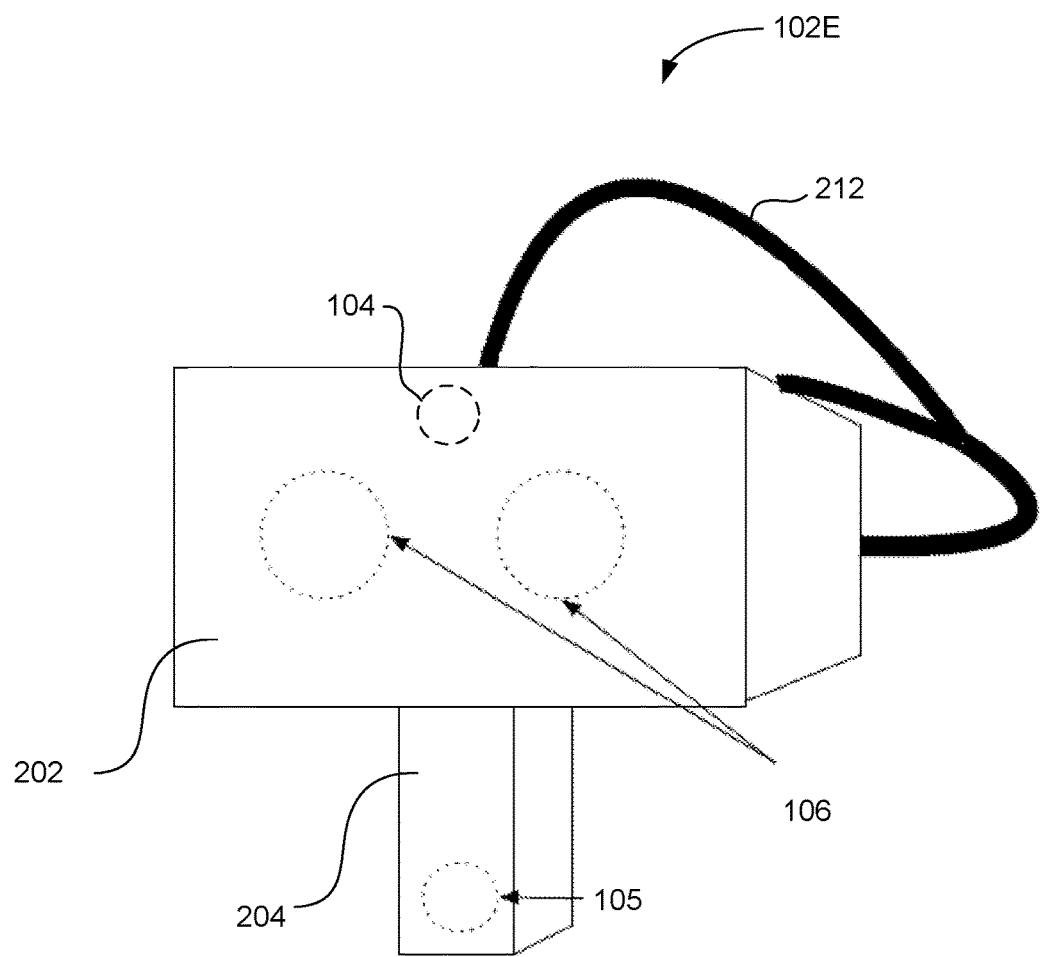
FIG. 2G is a schematic view illustrating a head-mounted display unit with a 2D camera in the middle top portion of a main body, according to one embodiment.

FIG. 2G is a schematic view of HMD 102E, according to one embodiment. HMD 102D is similar to HMD 102 of FIG. 2A except that a single 2D camera 104 is located at the center of the main body 202. The single 2D camera 104 captures left and right eye regions of a user's face, as described below with reference to FIG. 2I.

Figure 2H:
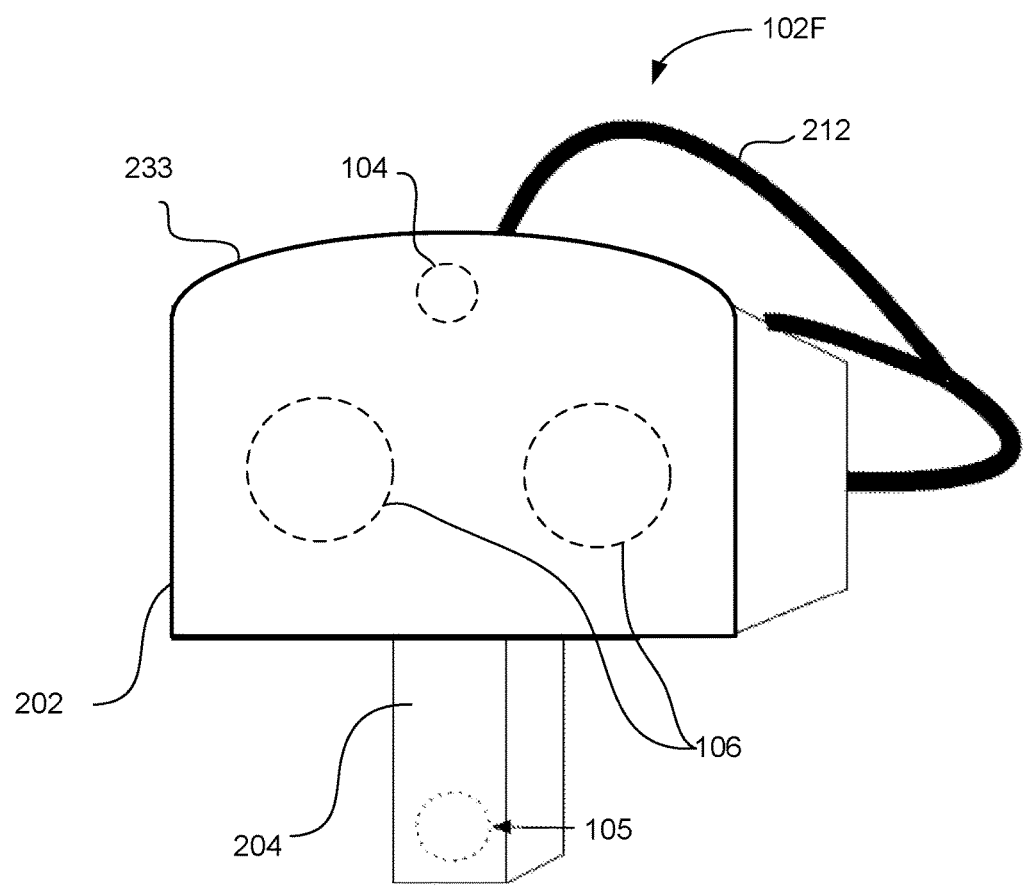
FIG. 2H is a schematic view illustrating a head-mounted display unit with a bulging upper portion to enclose a 2D camera, according to one embodiment.

FIG. 2H is a schematic view of HMD 102F, according to one embodiment. HMD 102F is similar to the HMD 102E of FIG. 2G except that the main body 202 has an upward protruding edge 233. The upward protruding edge 233 enables the eye regions of the user's face to be fully enclosed under the main body 202.

Figure 2I:
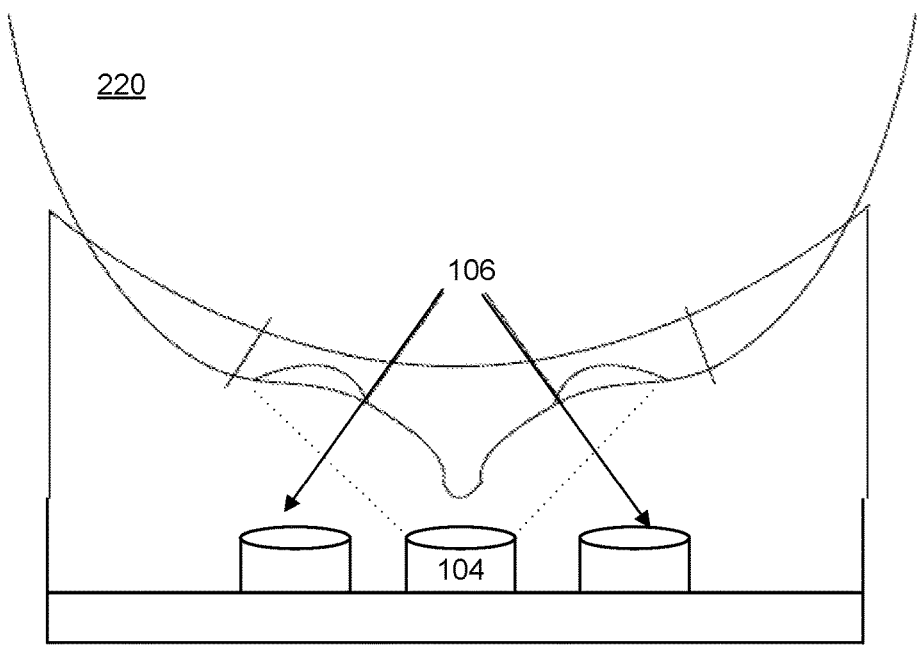
FIG. 2I is a schematic diagram illustrating capturing of the user's eye region using the head-mounted display unit of FIG. 2G or FIG. 2H, according to one embodiment.

FIG. 2I is a schematic view illustrating capturing of eye regions at both sides using a single 2D camera 104 in HMD 102E of FIG. 2G or HMD 102F of FIG. 2H. To increase the region of the face captured by the 2D camera 104, a fisheye lens may be used in the 2D camera 104.

Figure 2J:
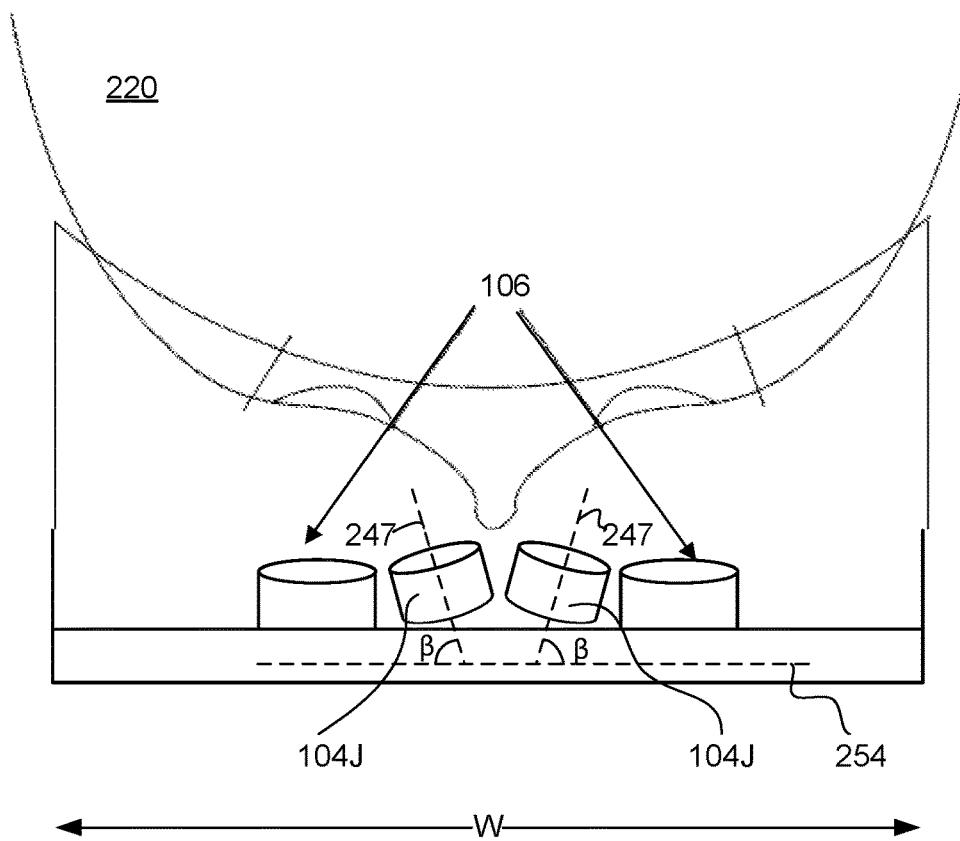
FIG. 2J is a schematic diagram illustrating placing of a pair of 2D cameras between display devices in a head-mounted display unit, according to one embodiment.

FIG. 2J is a schematic illustrating capturing of eye regions at both sides using two separate 2D cameras 104J, according to one embodiment. Unlike 2D cameras 104 of FIG. 2C, 2D cameras 104J are placed between displays 106. The center axes 247 of the 2D cameras 104J form an angle β relative to a vertical plane 254 so that both 2D cameras 104J face the eye regions of the face. One of many advantage of placing the 2D cameras 104J between the displays 106 is that the dimension (especially the width W) of the HMD can be reduced.

Figure 2K:
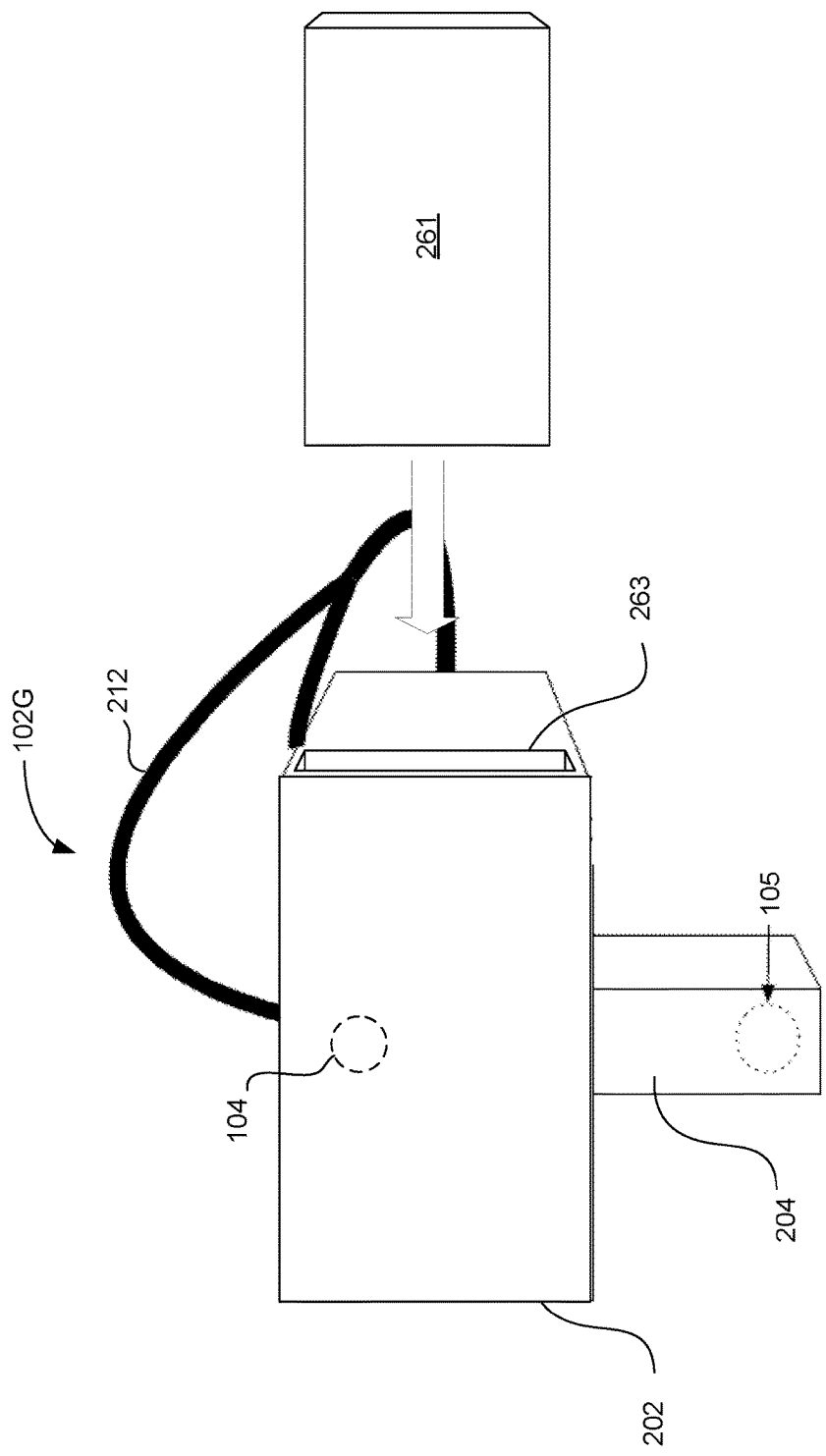
FIG. 2K is a schematic diagram illustrating a head-mounted display unit receiving a mobile device, according to one embodiment.

Although HMDs described above with reference to FIGS. 2A through 2J are described above as using dedicated displays 106 for displaying images to each eye, in other embodiments, displays may be embodied as a display device of a separate mobile device (e.g., smartphone). For example, FIG. 2K is a schematic diagram of an HMD 102G having a slot 263 for receiving a mobile device 261. The mobile device 261 may be inserted into the slot 263 of main body 202 so that the display device of the mobile device functions as the display of HMD 102G. The slot 263 as illustrated in FIG. 2K is merely illustrative and slots of different configuration can also be employed. In the embodiment of FIG. 2K, the display 106 as well as the computing device 108 is embodied by the mobile device 261.

Example Computing Device for Determining Facial Expressions

Figure 3:
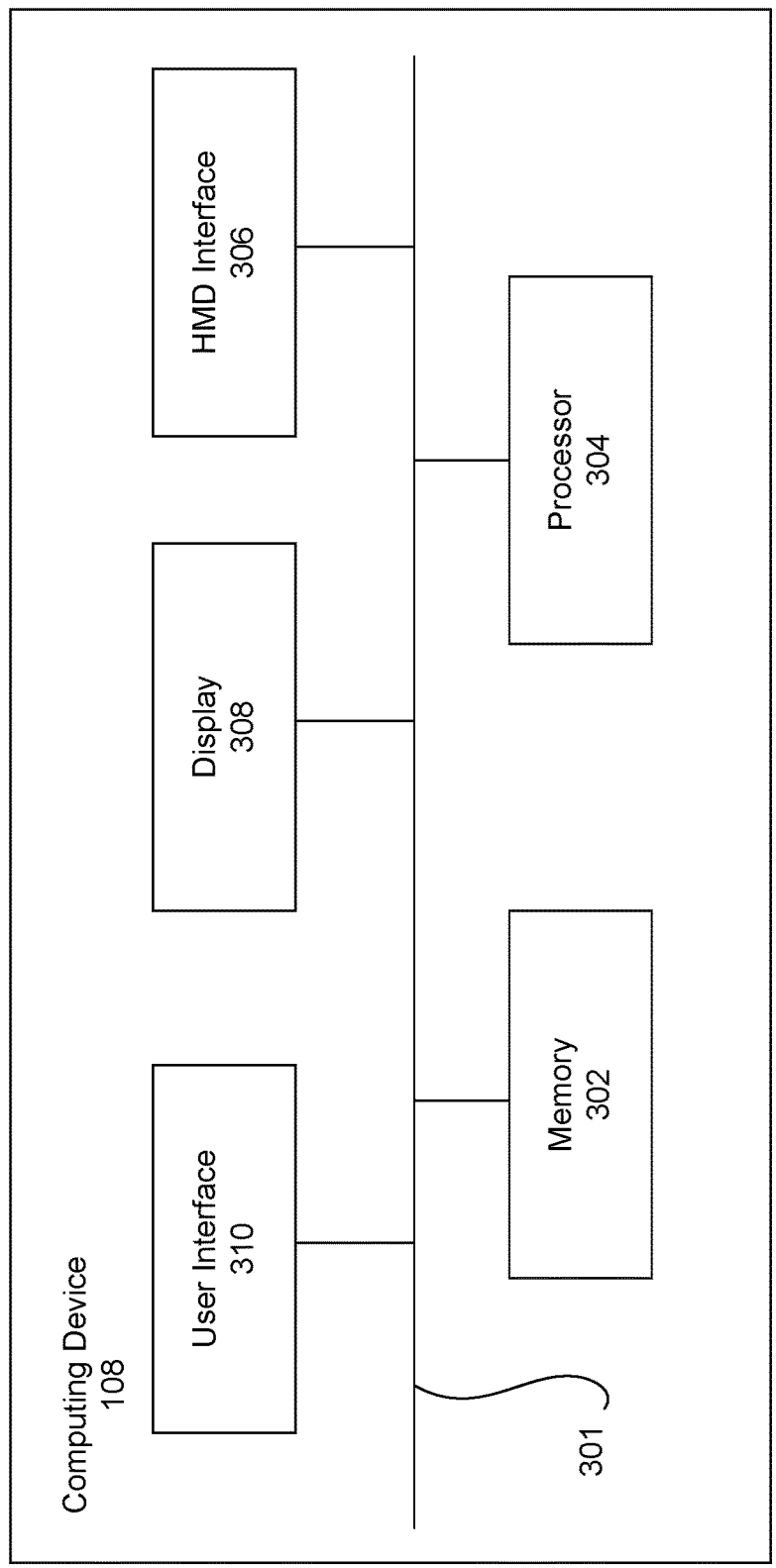
FIG. 3 is a block diagram illustrating a computing device connected to the head-mounted display unit for determining facial expressions, according to one embodiment.

FIG. 3 is a block diagram illustrating computing device 108 connected to HMD 102 for determining facial expressions, according to one embodiment. The computing device 108 may include, among other components, memory 302, a processor 304, an HMD interface 306, a display 308, a user interface 310 and a bus 301 connecting these components. The computing device 108 may include other components such as network interfaces to communicate with other computing devices (not shown).

Memory 302 is a non-transitory computer-readable storage medium storing software module, as described below in detail with reference to FIG. 4. The instructions stored in memory 302 are executed by processor 304 to perform operations associated with facial expression detection and generation of the user's digital representation that incorporate the detected facial expressions.

Processor 304 executes various instructions stored in memory 302 and controls operations of other components in computing device 108. Computing device 108 may include more than one processor.

HMD interface 306 is hardware, software, firmware or their combination for communicating with HMD 102. HMD interface 306 enables the computing device 108 to send images and sound data 120 for reproduction at HMD 102 and can also receive information 110 associated with the posture of the user's head and captured images associated with facial expressions from HMD 102. HMD interface 306 may be compatible with one or more communication protocols.

Display 308 is used for rendering and presenting images to user. The images may include information associated with the operation of HMD 102.

User interface 310 is hardware, software, firmware or their combination to enable the users to interact with the computing device 108. User interface 310 may include pointing devices (e.g., mouse) and keyboard.

Figure 4:
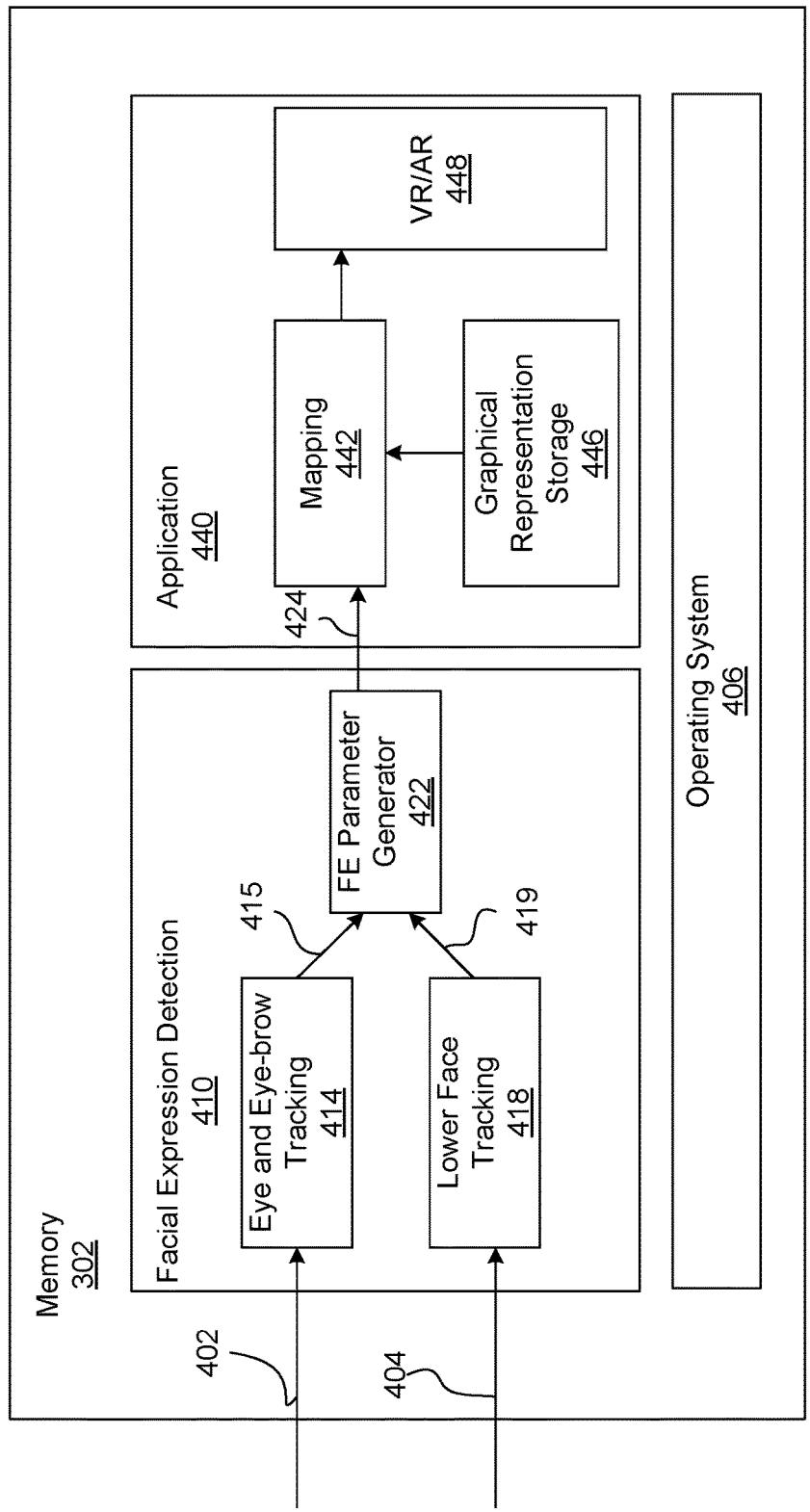
FIG. 4 is a block diagram of software modules in the computing device, according to one embodiment.

FIG. 4 is a block diagram of software modules in computing device 108, according to one embodiment. Memory 302 stores, among other software components, operating system 406, a facial expression detection module 410 and an application module 440. Memory 302 may also include various other software modules not illustrated in FIG. 4.

Operating system 406 is a software module responsible for managing resources available in the computing device 108. Available operating systems may include, for example, IOS, WINDOWS, LINUX, ANDROID, and MAC OS.

Facial expression detection module 410 is a software module that detects facial expressions of a user based on 2D images (e.g., infrared images) 402 received from 2D cameras 104 and images 404 received from depth camera 105. The images 404 may include both depth images and color or grayscale images generated by depth camera 105. By processing the infrared images 402 and the images 404, the facial expression detection module 410 generates facial expression (FE) parameters 424 that indicate the user's facial expressions.

Facial expression detection module 410 may include sub-modules including, but not limited to, eye and eyebrow tracking module 414, lower face tracking module 418 and FE parameter generator 422. Eye and eyebrow tracking module 414 determines the center of the pupil, eye contours, and eyebrow contours in the 2D images 402 based on landmark locations. Eye and eyebrow tracking module 414 is pre-trained with training image samples with annotation of the landmarks of the pupil, eye contours and eyebrow contours. Such annotation may be performed manually. Example landmarks are illustrated in FIGS. 5A and 5B as "X" points.

Eye and eyebrow tracking module 414 may employ a tracking algorithm. The tracking algorithm may use, for example, (i) supervised descent method (SDM), (ii) deformable model fitting, (iii) active appearance modeling or (iii) deep learning techniques, which are well known in the art. As a result of tracking eyes and eye brows of the user, the eye and eyebrow tracking module 414 generates landmark locations 415 indicating the location and shape of the eye and eyebrow. When a fisheye lens is used to capture the 2D image, the eye and eyebrow tracking module 414 may also flatten the image to remove distortion in the 2D image caused by the use of the fisheye lens before executing a tracking algorithm.

Similarly, lower face tracking module 418 tracks the posture of at least one of user's nose, lip, chin, cheek and the face silhouette around the chin and cheek based on images 404. To track the landmarks of the user's lower face, the lower tracking module 418 may also use the tracking algorithm, for example, using one of (i) supervised descent method (SDM), (ii) deformable model fitting, (iii) active appearance modeling and (iv) deep machine learning, which are well known in the art. The landmarks in the lower portion of the user's face are illustrated, for example, in FIG. 5C. By tracking the landmarks in the lower portion of the user's face, the lower face tracking module 418 generates landmark locations 419 of the lower facial features including at least one of the nose, lip, chin and cheek. One of many advantages of detecting silhouette around the chin and cheek is that it can explicitly capture the jaw and cheek movements. It also helps to track the head position relative to the camera robustly, which is not easy with lip tracking.

FE parameter generator 422 receives landmark locations 415, 419 as well as 3D depth map from the depth camera. FE parameter generator 422 stores a model of personalized 3D facial expression model obtained during a calibration process, as described below in detail with reference to FIG. 6. FE parameter generator 422 also performs fitting of landmark locations 415, 419 and 3D depth map to the model of 3D facial expression model to extract facial expression (FE) parameters 424 that collectively indicate the facial expressions of the user wearing HMD 102, as described below in detail with reference to FIG. 7.

Application module 440 performs various operations based on the detected facial expressions in the form of FE parameters 424. Application module 440 may include, among others, mapping module 442, a graphical representation storage 446 and virtual reality (VR)/augmented reality (AR) module 448. Graphical representation storage 446 stores one or more digital representations of the user. The mapping module 442 retrieves the user's digital representation from graphical representation storage 446 and transfers the FE parameters 424 (e.g., blendshape weight values) in real-time to the received digital representation of the user to generate data for use in VR/AR module 448.

VR/AR module 448 may generate user's 3D graphical representation with facial expressions according to FE parameters 424 (e.g., blendshapes) or based on the semantic mapping function between the transferred blendshape weights and expression parameter space of the user's digital representation. VR/AR module 448 may be part of or operate in conjunction with software modules for performing various services including, for example, social networking services, games, online shopping, video call, and human-machine interface based on facial expressions.

Although the facial expression detection module 410 and the application module 440 is described in FIG. 4 as being embodied as software modules, these modules may be embodied as integrated circuit (IC) components.

Process of Detecting Facial Expressions

Figure 6:
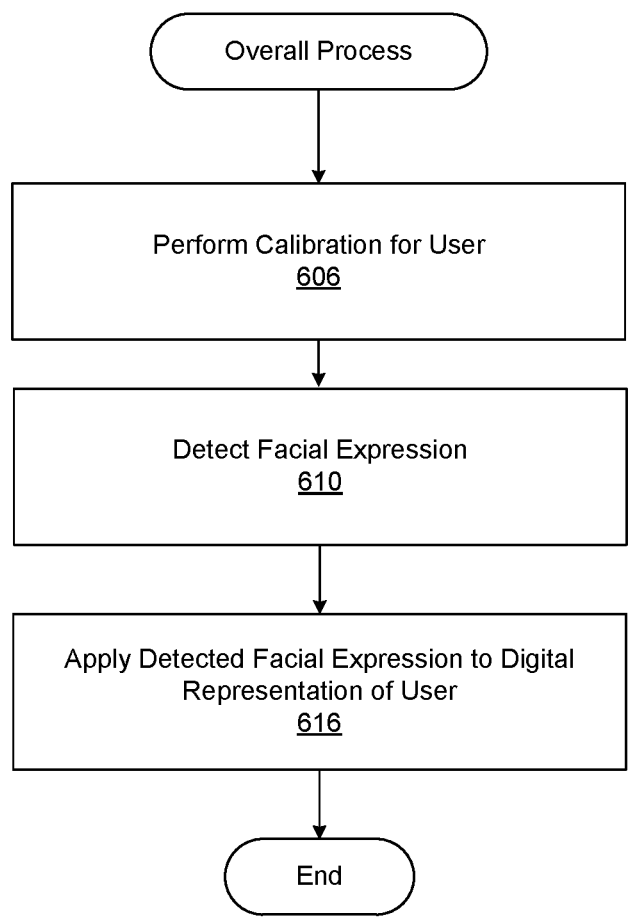
FIG. 6 is a flowchart illustrating an overall process of using facial expressions in a user's digital representation, according to one embodiment.

FIG. 6 is a flowchart illustrating an overall process of using facial expressions in a user's digital representation, according to one embodiment. First, calibration is performed 606 after the user wears the HMD 102. In one embodiment, an online calibration process is used to build a personalized tracking model for the user of the HMD 102. During the calibration, the user keeps a neutral facial pose for a predetermined amount of time (e.g., few seconds) while the 2D camera 104 and/or depth camera 105 captures multiple depth images and the 2D color images or infrared images.

As part of the calibration process, the facial expression detection module 410 receives these images, and applies the 3D volumetric model creation process to create a smoothed 3D volumetric facial mesh for the lower half of the face with the associated facial color information. The process of creating the smoothed 3D volumetric facial mesh is well known in the art (for example, in Richard A. Newcombe, et al., "KinectFusion: Real-time Dense Surface Mapping and Tracking," Mixed and augmented reality (ISMAR), 2011 10th IEEE international symposium, 2011, which is incorporated by reference herein in its entirety). The facial expression detection module 410 also performs the 2D landmark detection on the eye region images and the lower face images to locate the center and the circumference of the eyes, eye lines, eyebrow lines, lip lines, nose lines and facial silhouettes (e.g., chin and cheek lines). The facial expression detection module 410 may average the 2D landmarks over the multiple captured images to alleviate the noise artifacts in the 2D landmark detection. Using the 3D volumetric facial mesh and 2D facial landmark positions in the 2D images, FE parameter generator 422 builds a personalized neutral face model by (i) estimating the rigid pose of a template neutral face model and then (ii) warping a linear principal component analysis (PCA) model of a neutral face to fit the volumetric mesh and 2D landmarks.

Specifically, the FE parameter generator 422 utilizes the linear PCA morphable version of the personalized neutral model M to represent the facial mesh W in the world coordinate using the following equation:

$$W(w,R,t) = RM(w) + t \quad (2)$$

where w represents the linear weight vector for the morphable model, R is the rotation matrix and t is the translation vector. The FE parameter generator 422 determines w and (R, t) iteratively by minimizing the following energy term:

$$\min_{w,R,t} \alpha C_{pl} + \beta C_m + \gamma (C_r + C_l) \quad (3)$$

where $\alpha, \beta, \gamma$ represents the weights for the fitting terms; $C_{pl}$ is a fitting term to minimize the point-to-plane error between the volumetric mesh V and the facial mesh W, as defined by equation (4); Cm is a fitting term to minimize the point-to-point error between the 2D facial feature landmarks of the mouth, nose and silhouette, and the corresponding vertices of the facial mesh W, as defined by equation (5); Cr is a fitting term to minimize the point-to-point error between the 2D facial feature landmarks of the right eye region and the corresponding vertices of the facial mesh W, as defined by equation (6); and $C_l$ is a fitting term to minimize the point-to-point error between the 2D facial feature landmarks of the left eye region and the corresponding vertices of facial mesh W, as defined by equation (7). $C_{pl}$ is defined as follows:

$$C_{pl} = \sum_i [n_i \cdot (v_i - \bar{v}_i)]^2 \quad (4)$$

where $v_i$ is i-th vertex of the facial mesh W, $\bar{v}_i$, is the closest point of $v_i$ on the volumetric mesh V and $n_i$ is the surface normal at $v_i$ on the volumetric mesh V. Cm is defined as follows:

$$C_m = \sum_j \|\pi_m(v_j) - u_j\|_2^2 \quad (5)$$

where $u_j$ is the position of a tracked 2D facial feature and $\pi_m(v_j)$ is the projection of the corresponding mesh vertex $v_j$ into the camera space around the user's mouth, nose and silhouette. $C_r$ is defined as follows:

$$C_r = \sum_j \|\pi_r(v_j) - u_j\|_2^2 \quad (6)$$

where $u_j$ is the position of a tracked 2D facial feature and $\pi_r(v_j)$ is the projection of the corresponding mesh vertex $v_j$ into the camera space of right eye region. $C_l$ is defined as follows:

$$C_l = \sum_j \|\pi_l(v_j) - u_j\|_2^2 \quad (7)$$

where $u_j$ is the position of a tracked 2D facial feature and $\pi_r(v_j)$ is the projection of the corresponding mesh vertex $v_j$ into the camera space of left eye region.

After the personalized neutral facial mesh is constructed, the personalized facial expression model (blendshape model) is obtained by transferring the deformation from the expression blendshapes of the template face via deformation transfer, as well known in the art. An example method of transferring the deformation from the expression blendshapes via deformation transfer is described, for example, in Robert W. Sumner et al., "Deformation transfer for triangle meshes," ACM Transactions on Graphics (TOG) 23.3 (2004), pp. 399-405. Alternatively, personalized facial expression model can be obtained by applying the bilinear facial model which encodes a span of facial geometry, identity and facial expression into a multi-rank data tensor. An example method of applying the bilinear face model to build the personalized facial expression model is described, for example, in Chen Cao et al., "Displaced dynamic expression regression for real-time facial tracking and animation," ACM Transactions on Graphics (TOG) 33.4 (2014), which is incorporated by reference herein in its entirety.

If only one camera is used for both the right and left eyes, $C_r$ and $C_l$ are combined into one equation.

After performing calibration, 2D images and depth images of the user's facial features are tracked and processed to detect 610 the user's facial expressions, as described below in detail with reference to FIG. 7.

The detected facial expression is then applied 616 to a digital representation of the user for incorporation into the user's graphical representation. The generated graphical representation may be displayed in a virtual or augmented version of reality by the computing device 108 or a remote computing device communicating with the computing device 108 over a network (e.g., Internet).

Figure 7:
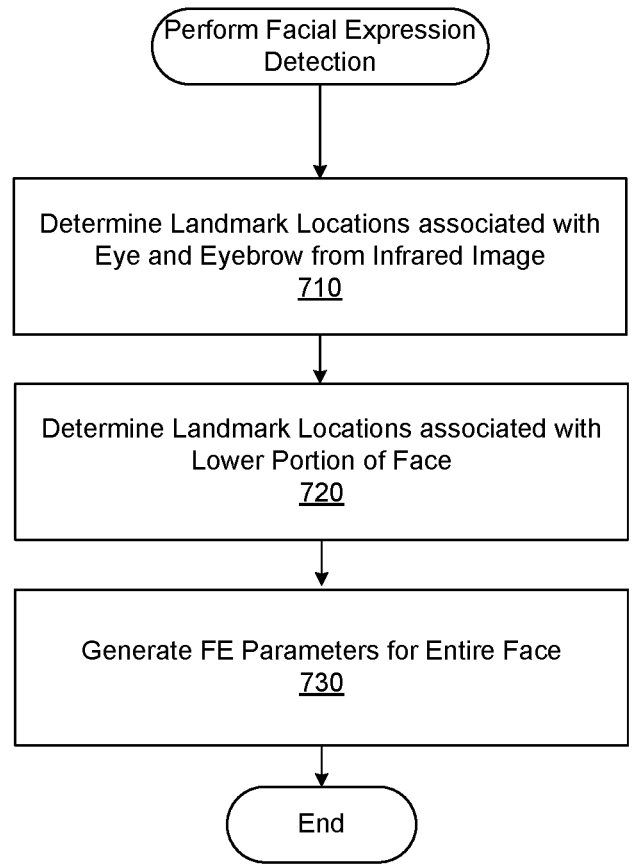
FIG. 7 is a flowchart illustrating a process of detecting a user's facial expressions, according to one embodiment.

FIG. 7 is a flowchart illustrating a process of detecting facial expressions, according to one embodiment. First, landmarks locations 422 associated with eye regions are determined 710 from the 2D images, as described above in detail with reference to FIG. 4. Landmark locations associated with the user's lower facial features is generated 720 by processing the IR or RGB images and/or the depth image of the 3D camera, as described above in detail with reference to FIG. 4.

By using the landmark locations (and optionally 3D depth map data), FE parameters 424 for the entire face of the user is generated 730. In one embodiment, the FE parameter generator 422 generates blendshape parameters as part of FE parameters 424 to indicate expressions such as jaw-open, smile and puff based on landmark locations 415, while generating blendshape parameters as part of FE parameters 424 to indicate eye open/close and eyebrow up/down based on landmark locations 419.

In order to compute the FE parameters 424, the tracked landmark locations 415 are combined as input constraints and fitting is performed on the FE expression parameters based on the input constraints. The fitting operation may involve two parts: (i) rigid stabilization, and (ii) expression parameter tracking. An optimization operation may be performed between the rigid stabilization and the expression parameter tracking alternatively until both the rigid pose value and the parameter values converge.

For rigid stabilization, the rigid pose of the face is allowed to move relative to the cameras. When the user makes facial expressions, the chick muscle can push the headset forward and upwards, causing the relative rigid pose of the face with regard to cameras to change over time. When the pose is locked, the rigid motion creates the artifacts on the expression parameter tracking, and hence, incorrect parameter values due to irrelevant rigid motion factors may be obtained. Further, when the user makes a rapid head motion, the headset may slide relative to face even when the headset is tightly attached to the face. Such incidents may make the fixed head pose assumption invalid and create artifacts in the expression tracking. To accommodate repositioning of head relative to the headset, the rigid stabilization is performed to compute the relative pose of the head with regard to cameras rigidly fixed on the headset.

In one embodiment, Rigid Iteration Closest Point (ICP) algorithm is used during the calibration stage to determine the initial rigid pose of the head. But after switching to the tracking mode, an initial rigid pose is used as an anchor, which is allowed to perturb in a limited range to accommodate the relative head motion to the headset. Rigid ICP also may be performed on a few image frames in the beginning of the tracking mode to determine the initial rigid pose of the head to take into account offsetting of the head pose from the HMD, especially after the user takes off the HMD and wears it again. Then, the rigid pose is reinitialized by performing the Rigid ICP again. After the initial rigid pose is determined, Rigid ICP may be performed with additional constraints such that the yaw, roll, pitch of the rotation and the translation x, y, z values do not deviate beyond given limits of the initial rigid pose, while using the tracked landmark positions and input depth map as the input constraints.

To obtain FE parameters 424, fitting is performed on the personalized tracking model based on the landmark locations 415, 419 (and the depth map if 3D camera is used). As in the calibration process, the capturing cameras are assumed to be rigidly fixed on the headset and parameters on their relative pose (i.e., rotation and translation) are assumed to be known. FE parameter generator 422 may perform fitting operation to obtain FE expression parameters based on landmark locations 415, 419 (and the depth map if 3D camera is used).

A personalized linear model is a set of facial expression shapes (e.g., smile and jaw open) derived from a personalized neutral face model M. In one embodiment, the FE parameter generator 422 utilizes the personalized linear expression model (i.e., blendshape model) B to represent the facial mesh W, as shown in equation (8) in the world coordinate for performing the fitting optimization:

$$W(e) = RB(e) + t \quad (8)$$

where e is the linear weight vector for the blendshape model, R is the rotation matrix and t is the translation vector computed from the Rigid Stabilization step. The tracking process at the FE parameter generator 422 finds optimal e iteratively by minimizing the following energy term:

$$\min_{e} \alpha C_{pl}^* + \beta C_m^* + \gamma (C_r^* + C_l^*) \quad (9)$$

where $\alpha$, $\beta$, $\gamma$ represents the weights for the fitting terms; $C_{pl}$ is a fitting term to minimize the point-to-plane error between the depth map and the facial mesh W, as defined by equation (10); $C^*_m$ is a fitting term to minimize the point-to-point error between the 2D facial feature landmarks of the mouth, nose and silhouette, and the corresponding vertices of the facial mesh W, as defined by equation (11); $C^*r$ is a fitting term to minimize the point-to-point error between the 2D facial feature landmarks of the right eye region and the corresponding vertices of the facial mesh W, as defined by equation (12), and $C^*_l$ is a fitting term to minimize the point-to-point error between the 2D facial feature landmarks of the left eye region and the corresponding vertices of facial mesh W, as defined by equation (13). $C^*_{pl}$ is defined as follows:

$$C_{pl}^* = \sum_{i} [n_i \cdot (v_i - p_i)]^2 \quad (10)$$

where $v_i$ is the i-th vertex of the facial mesh W, $p_i$ is the point on the depth map that as the same camera space coordinate as $v_i$ and $n_i$ is the surface normal at $p_i$. $C^*_m$ is defined as follows:

$$C_m^* = \sum_{j} \|\pi_m(v_j) - u_j\|_2^2 \quad (11)$$

where $u_j$ is the position of a tracked 2D facial feature and $\pi_m(v_j)$ is the projection of the corresponding mesh vertex $v_j$ into the mouth camera space. $C^*_r$ is defined as follows:

$$C_r^* = \sum_{j} \|\pi_r(v_j) - u_j\|_2^2 \quad (12)$$

where $u_j$ is the position of a tracked 2D facial feature and $\pi_r(v_j)$ is the projection of the corresponding mesh vertex $v_j$ into the camera space of right eye region. $C^*_l$ is defined as follows:

$$C_l^* = \sum_j \|\pi_l(v_j) - u_j\|_2^2 \qquad (13)$$

where $u_j$ is the position of a tracked 2D facial feature and $\pi_l(v_j)$ is the projection of the corresponding mesh vertex $v_j$ into the camera space of left eye region. If only one camera is used for both the right and left eyes, $C_r$ and $C_l$ are combined into one equation.

In one embodiment, FE parameter generator 422 outputs blendshape weight values represented by e in equation (8) as FE parameters that collectively represent the detected facial expressions of the user are generated as a result of tracking process.

In one or more embodiments, the steps of FIG. 7 may be performed in real-time to process each set of image 402 and 404 received from the cameras. Further, the steps and sequence of steps as illustrated in FIG. 7 is merely illustrative. For example, the step of determining 710 landmark locations and the step of determining 720 3D depth map data can be performed in a reverse order or can be performed in parallel.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

The invention claimed is:

1. A method for detecting facial expressions, the method comprising:
    capturing, by a first image capturing device on a main body of a head-mounted display, first images of an upper portion of a user's face including the user's eye region;
    capturing, by a second image capturing device on an extension member of the head-mounted display extending downwards from the main body toward a lower portion of the user's face, second images of the user including the lower portion of the user's face; and
    processing the first images and the second images to extract facial expression parameters representing a facial expression of the user, the processing of the first images and the second images comprising:
        performing rigid stabilization to determine a relative pose of the user's face relative to the first image capturing device and the second image capturing device.

2. The method of claim 1, wherein the first image capturing device comprises a pair of infrared cameras, and the second image capturing device comprises one of a depth camera, a color camera, an infrared camera or two stereoscopic cameras.

3. The method of claim 1, processing the first images and the second images comprises:
    detecting landmark locations associated with the user's eye and the user's eyebrow from the first images; and
    detecting landmark locations associated with a lower portion of the user's face from the second images.

4. The method of claim 1, further comprising applying the extracted facial expression parameters to a digital representation of the user to generate a graphical representation of the user.

5. The method of claim 1, further comprising performing calibration by capturing and processing calibration images representing a neutral face of the user.

6. The method of claim 5, wherein performing calibration comprises:
    generating a personalized neutral face mesh based on the calibration images, and
    building a personalized tracking model by applying a deformation transfer technique to the personalized neutral face mesh, and
    wherein the processing of the first images and the second images comprises fitting at least a blendshape model to landmark locations in the first images and the second images based on the personalized tracking model to obtain the facial expression parameters.

7. The method of claim 6, wherein the processing of the first images and the second images is performed in real-time.

8. A virtual or augmented reality system comprising:
    a head-mounted display unit, comprising:
        a first capturing device configured to capture first images of an upper portion of a user's face including an eye region,
        a second capturing device at a location below the first capturing device and configured to capture second images of a lower portion of the user's face,
        a display device configured to display images to the user, a body configured to mount the first capturing device and the display device, and
        an extension member extending from the body toward the lower portion of the user's face, the second capturing device mounted on the extension member; and
    a computing device communicatively coupled to the head-mounted display unit and configured to:
        receive the first and second images from the head-mounted display unit,
        perform calibration by (i) generating a personalized neutral face mesh based on rigid stabilization, and (ii) building a personalized tracking model by applying a deformation transfer technique to the personalized neutral face mesh, and
        process the first images and the second images to extract facial expression parameters representing a facial expression of the user by fitting at least a blendshape model to landmark locations in the first images and the second images based on the personalized tracking model to obtain the facial expression parameters.

9. The virtual or augmented reality system of claim 8, wherein the computing device is configured to:
    detect landmark locations associated with the user's eye and the user's eyebrow from the first images; and
    detect landmark locations associated with the lower portion of the user's face from the second images.

* * * * *